US012632962B2

(12) United States Patent
Garg et al.

(10) Patent No.: US 12,632,962 B2
(45) Date of Patent: May 19, 2026

(54) SYSTEM AND METHOD FOR INTRAORAL IMAGING AND ANALYSIS FOR PREVENTING DENTAL DISEASE

(71) Applicants: Ayush Garg, Dublin, CA (US); Divij Vikram Motwani, Palo Alto, CA (US)

(72) Inventors: Ayush Garg, Dublin, CA (US); Divij Vikram Motwani, Palo Alto, CA (US)

( * ) Notice: Subject to any disclaimer, the term of this patent is extended or adjusted under 35 U.S.C. 154(b) by 0 days.

(21) Appl. No.: 18/927,688

(22) Filed: Oct. 25, 2024

(65) Prior Publication Data

US 2026/0120272 A1 Apr. 30, 2026

(51) Int. Cl.
*G06T 7/00* (2017.01)
*G06T 7/10* (2017.01)

(52) U.S. Cl.
CPC .............. *G06T 7/0012* (2013.01); *G06T 7/10* (2017.01); *G06T 2207/30036* (2013.01)

(58) Field of Classification Search
CPC .................... G06T 7/0012; G06T 7/10; G06T 2207/30036
See application file for complete search history.

(56) References Cited

U.S. PATENT DOCUMENTS

| | | | |
|---|---|---|---|
| 2019/0340760 A1* | 11/2019 | Swank | ........................ G06T 7/74 |
| 2021/0077233 A1* | 3/2021 | Yancey | ................. A61B 5/4547 |
| 2021/0177266 A1* | 6/2021 | Teufel | .................. A61B 5/0086 |
| 2022/0313402 A1* | 10/2022 | Katzman | ................. A61C 7/002 |
| 2024/0023800 A1* | 1/2024 | Fridman | ............ A61B 1/00052 |
| 2024/0122463 A1* | 4/2024 | Li | ......................... H04N 23/667 |
| 2024/0189078 A1* | 6/2024 | Cramer | .............. A61C 13/0004 |

OTHER PUBLICATIONS

Angelino K, Shah P, Edlund DA, Mohit M, Yauney G. Clinical validation and assessment of a modular fluorescent imaging system and algorithm for rapid detection and quantification of dental plaque. BMC Oral Health. Dec. 2, 20178; 17(1):162. doi: 10.1186/s12903-017-0472-4. PMID: 29284461; PMCID: PMC5745686. (Year: 2017).*
Dentulu. (2023, March). MouthCAM Teledentistry Camera. https://www.dentulu.com/mouthcam-teledentistry-camera.html, see also: https://web.archive.org/web/20230326085729/https://www.dentulu.com/mouthcam-teledentistry-camera.html#expand. (Year: 2023).*

* cited by examiner

*Primary Examiner* — Bobbak Safaipour
*Assistant Examiner* — Ashley Hytrek
(74) *Attorney, Agent, or Firm* — Procopio, Cory, Hargreaves & Savitch LLP

(57) ABSTRACT

The present disclosure provides a system and a method for intraoral imaging and analysis for preventing a dental disease. The system receives one or more images captured by at least one camera associated with an Ultraviolet-A Light Emitting Diode (UV-A LED) of an intraoral device, and processed by a processing unit of the intraoral device. The system segments, via an Artificial Intelligence (AI) model, each of the one or more images. The system extracts, via the AI model, one or more features from each of the one or more segmented images, and detects one or more dental conditions of a user to prevent a dental disease of the user, based on the one or more features.

15 Claims, 5 Drawing Sheets

1000

SYSTEM AND METHOD FOR INTRAORAL IMAGING AND ANALYSIS FOR PREVENTING DENTAL DISEASE

FIELD OF THE INVENTION

The disclosure relates generally to dental health technologies. Particularly and not exclusively, the subject matter of the instant disclosure relates to systems and methods for capturing and analyzing images of an oral cavity for detection, monitoring, and prevention of dental diseases.

BACKGROUND

Oral healthcare is considered vital to an overall health of a person, but it is often disregarded in a larger context of personal hygiene. Poor dental hygiene is becoming increasingly prevalent, leading to preventable oral diseases that affect billions of people globally. A majority of the global population suffers from some form of oral disease. These conditions often stem from poor dietary habits and an aversion to dental visits due to high costs, unavailability, or fear. Poor oral health may result in painful tooth loss and has been associated with cancer and cardiovascular diseases, underscoring a need for effective prevention strategies.

Oral diseases primarily arise from a buildup of plaque and tartar on teeth. Plaque accumulation provides a breeding ground for acid-producing bacteria that feed on sugars and refined carbohydrates, leading to infections and tooth damage known as dental caries or cavities. If left unchecked, the plaque can harden into calculus or tartar, which can lead to gum diseases such as gingivitis and periodontitis.

Currently, it is challenging for individuals to accurately assess their own oral health. Feedback on the oral health typically relies on X-rays or other specialized equipment and dental examinations, which are usually only available in dental offices. Since most people only visit the dentist once or twice a year, oral diseases such as gingivitis, which can develop extremely rapidly, may go unnoticed until they are well advanced. Moreover, interpreting medical images can be difficult, with even highly trained professionals sometimes missing signs of oral issues.

Conventionally, detection of dental issues using Artificial Intelligence (AI) techniques has primarily focused on X-rays or other specialized equipment(s) available only in dental clinics. Furthermore, a recent conventional method uses Convolutional Neural Networks (CNNs) on Red, Green, and Blue (RGB) images to identify calculus and inflammation from oral images taken on smartphones. Such methods were able to validate the feasibility of using color dental images for detecting periodontal diseases. However, these methods were limited to images of the front teeth, making it impractical for monitoring the health of the entire mouth, and yielded relatively low accuracy for a classification task.

A significant challenge in solely using the RGB images to detect the plaque and the calculus is a lack of contrast between white plaque and tooth enamel. To overcome this challenge, a special biomarker is used in the plaque that causes autofluorescence when exposed to ultraviolet (UV-A) light between 395-405 nanometers. While this technique is used in some dental practices, it has not yet been integrated into a fully automated system available to consumers for at-home use.

There is, therefore, a need in the art for improved systems and methods to efficiently perform at-home intraoral imaging and analysis by overcoming the deficiencies in the prior art(s).

SUMMARY

In order to obviate the shortcomings of the background art, a system for intraoral imaging and analysis for preventing a dental disease is provided and illustrated in the instant disclosure.

Principally, in accordance with the most preferred embodiment of the present disclosure, a system for intraoral imaging and analysis for preventing a dental disease includes one or more processors and a memory operatively coupled to the one or more processors. The memory includes processor-executable instructions, which on execution, cause the one or more processors to receive one or more images captured by at least one camera associated with an Ultraviolet-A Light Emitting Diode (UV-A LED) of an intraoral device, and processed by a processing unit of the intraoral device. The one or more processors segment each of the one or more images, via an Artificial Intelligence (AI) model (e.g., by an Application Programming Interface (API) associated with the system). The one or more processors extract, via the AI model, one or more features from each of the one or more segmented images, and detect one or more dental conditions of a user to prevent a dental disease of the user, based on the one or more features.

In some embodiments, the one or more features may include at least one of outlines of teeth of the user, a fluorescence of the teeth, plaques accumulated in one or more spaces between the teeth, and plaques accumulated with gums.

In some embodiments, the one or more processors may detect the one or more dental conditions of the user by being configured to analyze the one or more features in each of the one or more segmented images, identify teeth in each of the one or more segmented images based on the one or more features, remove one or more regions including at least gums surrounding the teeth from each of the one or more segmented images, and upon removing the one or more regions, detect the one or more dental conditions of the user.

In some embodiments, the memory includes processor-executable instructions, which on execution, may cause the one or more processors to display the one or more images, received from the intraoral device, to the user via a user device upon authentication of one or more user credentials provided by the user.

In some embodiments, the memory includes processor-executable instructions, which on execution, may cause the one or more processors to store the one or more images received from the intraoral device, and the one or more user credentials provided by the user in one or more databases.

In some embodiments, the one or more processors may store the one or more images including a plurality of parameters in the one or more databases, by assigning an identifier to each of the one or more images.

In some embodiments, the plurality of parameters may include at least one of a date of capture, a time of capture, and a location of capture relative to the camera's position in the oral cavity of each of the one or more images.

In an aspect, the most preferred embodiment of the present disclosure relates to a method for intraoral imaging and analysis for preventing a dental disease. The method includes receiving, by one or more processors associated with a system, one or more images captured by at least one camera associated with an UV-A LED of an intraoral device, and processed by a processing unit of the intraoral device. The method includes segmenting, by the one or more processors, each of the one or more images, via an AI model. The method includes extracting, by the one or more processors, via the AI model, one or more features from each of the one or more segmented images, and detecting, by the one or more processors, one or more dental conditions of a user to prevent a dental disease of the user, based on the one or more features.

In some embodiments, the method may include displaying, by the one or more processors, the one or more images, received from the intraoral device, to the user via a user device upon authentication of one or more user credentials provided by the user.

In some embodiments, the method may include storing, by the one or more processors, the one or more images received from the intraoral device, and the one or more user credentials provided by the user in one or more databases.

In some embodiments, storing, by the one or more processors, the one or more images including a plurality of parameters in the one or more databases may include assigning an identifier to each of the one or more images.

In some embodiments, the plurality of parameters may include at least one of a date of capture, a time of capture, and a location of capture.

In an aspect, the present disclosure also relates to a non-transitory computer-readable medium including a processor configured to perform the methods discussed herein.

The following description is illustrative in nature and is not intended to be in any way limiting. In addition to the aforementioned illustrative aspects, embodiments, and features of the present disclosure, further aspects, embodiments and features will become apparent by reference to the following detailed description.

BRIEF DESCRIPTION OF THE ACCOMPANYING DRAWINGS

The accompanying drawings illustrate the best mode for carrying out the disclosure as instantly contemplated and set forth hereinafter. The instant disclosure may be more clearly understood from a consideration of the following detailed description of the preferred embodiments taken in conjunction with the accompanying drawings where all figures are diagrammatic and not to scale. Further, like reference letters and numerals indicate the corresponding parts in various figures in the accompanying drawings.

Figure 1:
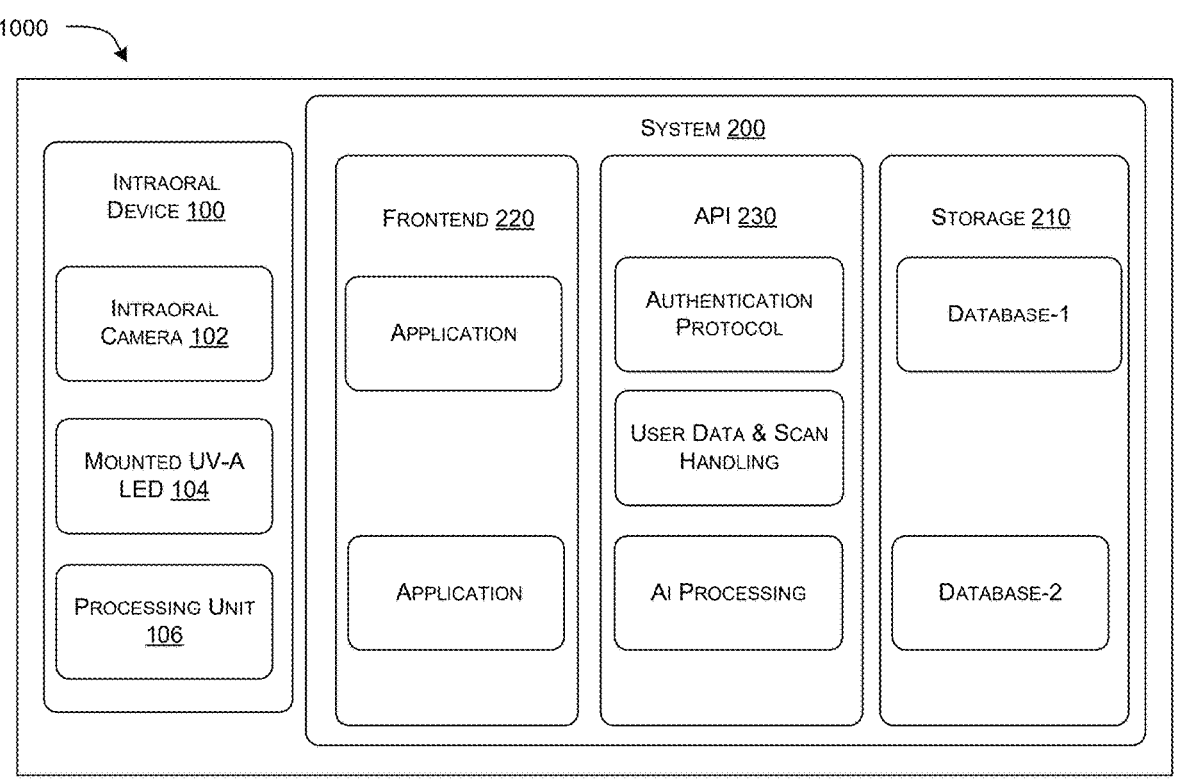
FIG. 1 illustrates an exemplary architecture of a system for intraoral imaging and analysis for preventing a dental disease, according to embodiments of present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the invention as set forth.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "some embodiments" or "other embodiments" or "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, "substantially" means largely or considerably, but not necessarily wholly, or sufficiently to work for the intended purpose. The term "substantially" thus allows for minor, insignificant variations from an absolute or perfect state, dimension, measurement, result, or the like as would be expected by a person of ordinary skill in the art, but that do not appreciably affect overall performance.

Existing dental issue detection systems use Artificial Intelligence (AI) techniques primarily focusing on X-rays or other specialized equipment available only in dental clinics. These have demonstrated the potential of AI models to detect dental diseases in clinics. Further, the proposed systems perform detection and classification of the oral diseases using Red, Green, and Blue (RGB) images, demonstrating the feasibility of using color dental images for detecting periodontal diseases. Furthermore, a conventional method uses Convolutional Neural Networks (CNNs) to identify calculus and inflammation from oral images. However, the prior art has been limited to images solely of front of the teeth, making it impractical for monitoring the health of the entire mouth and yielding relatively low accuracies. A significant challenge in using the RGB images to detect the plaque and the calculus is a lack of contrast between white plaque and tooth enamel. To overcome this challenge, a special biomarker is used in the plaque that causes it to fluoresce when exposed to ultraviolet light. While this technique is used in some dental practices, it has not yet been integrated into a fully automated system for at-home use.

Accordingly, in order to overcome at least the above-mentioned drawbacks associated with the existing dental issues detection systems, the present disclosure proposes a system and a method for intraoral imaging and analysis for preventing a dental disease. The system includes an intraoral device utilizing Ultraviolet-A Light Emitting Diode (UV-A LED) light and an intraoral camera for image capture and transmission. The system is embedded with an application which serves as a control panel for the system, provides insights into oral health, offers educational resources on maintaining oral hygiene, and facilitates communication with dentists in case of detected issues. The system uses one or more AI models for teeth segmentation and extraction.

Various embodiments of the present disclosure will be explained in detail with reference to FIGS. 1-6.

FIG. 1 illustrates an exemplary architecture 1000 of a system 200 for intraoral imaging and analysis for preventing a dental disease, according to embodiments of present disclosure.

With reference to FIG. 1, the system 200 may be associated with an intraoral device 100. The intraoral device 100 may include, but not limited to, an intraoral camera 102, an Ultraviolet-A Light Emitting Diode (UV-A LED) 104, and a processing unit 106. In some embodiments, the intraoral camera 102, the UV-A LED 104, and the processing unit 106 may be operatively and communicably connected with each other. In some embodiments, the intraoral camera 102 in association with the UV-A LED 104 may be configured to capture one or more images inside a user's mouth, including molars and back of each tooth. In some embodiments, the intraoral camera 102 may be configured to capture Red Green Blue (RGB) images of the user's teeth. In some embodiments, the UV-A LED 104 may be configured to transmit light between, for example, without limitation, 395-405 nm with a Three-Dimensional (3D)-printed attachment to the intraoral camera 102. In some embodiments, the UV-A LED 104 may be connected to the processing unit 106 over a Universal Serial Bus (USB).

In some embodiments, the one or more images captured by the intraoral camera 102 may be transferred to the processing unit 106. The processing unit 106 may be, for example, but not limited to, a Raspberry Pi™. In some embodiments, the processing unit 106 may be configured to process the one or more images captured by the intraoral camera 102 and transmit the one or more images to the system 200. In some embodiments, the processing unit 106 may turn on the UV-A LED 104 and the intraoral device 100, and read the data transmitted by the intraoral camera 102 over the USB using an Open Source Computer Vision Library (OpenCV). Further, the processing unit 106 may establish a connection with, for example, a Wireless-Fidelity (Wi-Fi) network, and create a stream using a Motion Joint Photographic Experts Group (mJPEG) protocol, to transmit the data to the system 200.

In some embodiments, the system 200 may be a computing device. It may be appreciated that the computing device may be interchangeably referred to as a User Equipment (UE) or a mobile device. In some embodiments, the UE may include smart devices operating in a smart environment, for example, an Internet of Things (IoT) system. The UE may be, for example, but are not limited to, a set-up box, a smart television (TV), a streaming media player, a media center personal computer (PC), and so on. In some embodiments, the UE may include, but is not limited to, smart phones, smart watches, smart sensors (e.g., mechanical, thermal, electrical, magnetic, etc.), networked appliances, networked peripheral devices, networked lighting system, communication devices, networked vehicle accessories, networked vehicular devices, smart accessories, tablets, smart television (TV), computers, smart security system, smart home system, other devices for monitoring or interacting with or for the users and/or entities, or any combination thereof.

A person of ordinary skill in the art will appreciate that the UE may include, but is not limited to, intelligent, multi-sensing, network-connected devices, that can integrate seamlessly with each other and/or with a central server or a cloud-computing system or any other device that is network-connected. In some embodiments, the UE may include, but is not limited to, a handheld wireless communication device (e.g., a mobile phone, a smartphone, a phablet device, and so on), a wearable computer device (e.g., a head-mounted display computer device, a head-mounted camera device, a wristwatch computer device, and so on), a Global Positioning System (GPS) device, a laptop computer, a tablet computer, or any type of portable computer, a media playing device, a portable gaming system, and/or any other type of computer device with wireless communication capabilities, and the like. In some embodiments, the UE may include, but is not limited to, any electrical, electronic, electromechanical, or an equipment, or a combination of one or more of the above devices such as virtual reality (VR) devices, augmented reality (AR) devices, a laptop, a general-purpose computer, a desktop, a personal digital assistant, a tablet computer, a mainframe computer, or any other computing device, wherein the UE may include one or more in-built or externally coupled accessories including, but not limited to, a visual aid device such as a camera, an audio aid, a microphone, a keyboard, and input devices for receiving input from the user or the entity such as a touch pad, a touch enabled screen, an electronic pen, and the like.

A person of ordinary skill in the art will appreciate that the UE may not be restricted to the mentioned devices and various other devices may be used.

In some embodiments, the UE may communicate with the system 200 through a network. In some embodiments, the system 200 may be associated with the UE. In some embodiments, the system 200 may be the UE. The network may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In some embodiments, the system 200 may receive the one or more images captured by the intraoral camera 102 associated with the UV-A LED 104, and processed by the processing unit 106 of the intraoral device 100, over the network. In some embodiments, the system 200 may be embedded with one or more applications 220 to display the one or more images to the user via a user interface. In some embodiments, the system 200 may transfer the one or more images to an Application Programming Interface (API) 230 associated with the system 200.

The API 230 may include an authentication protocol to perform authentication of the user based on one or more user credentials provided by the user to the system 200 via the user interface. The one or more user credentials may include, but not limited to, a name of the user, an email of the user, and a password.

In some embodiments, the API 230 may be configured to analyze and process the one or more images using an Artificial Intelligence (AI) model. In some embodiments, the system 200 may be configured to segment, via the AI model, each of the one or more images by the API 230. In some embodiments, the system 200 may be configured to extract, via the AI model, one or more features from each of the one or more segmented images. The one or more features may include, but not limited to, an outline of teeth of the user, a fluorescence of the teeth, plaques accumulated in one or more spaces between the teeth, and plaques accumulated with gums. In some embodiments, the system 200 may be configured to detect one or more dental conditions of the user to prevent a dental disease of the user, based on the one or more features. In some embodiments, the system 200 may be configured to store the one or more images received from the intraoral device 100, and the one or more user credentials provided by the user in one or more databases 210. The one or more databases 210 may be, for example, but not limited to, a NoSQL MongoDB Atlas™ database and an AWS™ S3 bucket.

In some embodiments, the API 230 may be created using a Hypertext Transfer Protocol (HTTP) flask server running on, for example, a Linux computer. The flask server may be connected to the AWS S3 bucket, which may store raw and processed images, and the NoSQL MongoDB Atlas database to store user information and scan metadata. The user data including their name, email, and password may be sent to the MongoDB database, and protocols for signing in and signing up may be created. When signed in, a JavaScript Object Notation (JSON) Web Token (JWT) may be generated, which may ensure that the user data may be maintained secure. Additionally, the token may expire after 30 minutes, which would sign the user out after a period of inactivity.

In some embodiments, the images (consisting of a date, a time, and a list of images, and their locations) may be uploaded to the API 230 using a Base64 encoding of JPEG images and then saved to the S3 bucket to store for later use. Each image may include a location it represents, such as a back molar in the mouth. In some embodiments, a Universally Unique Identifier version 4 (UUIDv4) identifier may be assigned to each image, and the datetime, processing status, and detected plaque area may be saved to the MongoDB database.

Although FIG. 1 shows exemplary components of the system 200, in other embodiments, the system 200 may include fewer components, different components, differently arranged components, or additional functional components than depicted in FIG. 1. Additionally, or alternatively, one or more components of the system 200 may perform functions described as being performed by one or more other components of the system 200.

Figure 2:
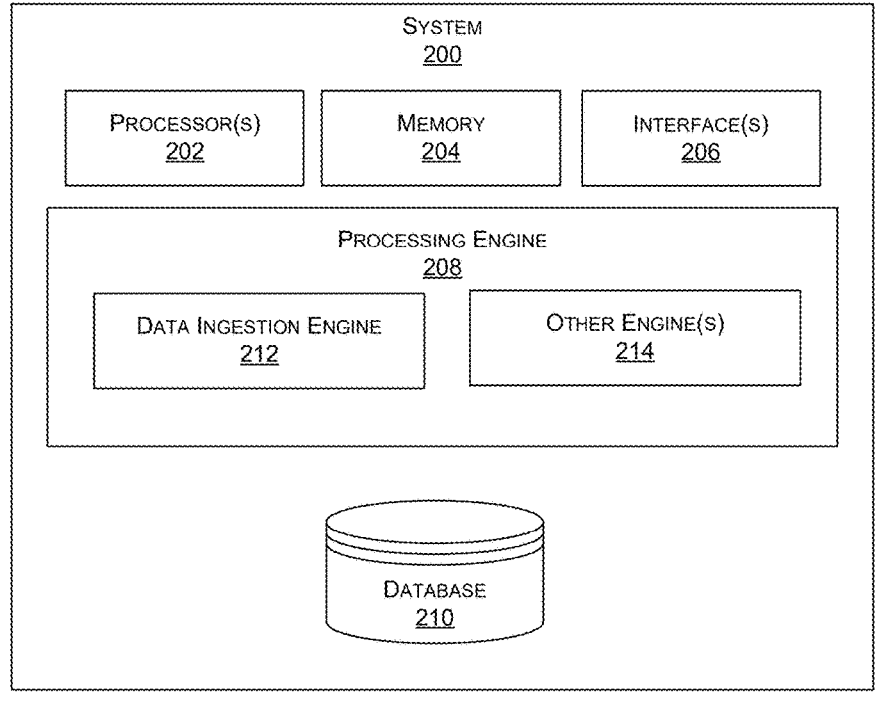
FIG. 2 illustrates an example block diagram of the system for intraoral imaging and analysis for preventing a dental disease, according to embodiments of present disclosure.

FIG. 2 illustrates an example block diagram of the system 200 for intraoral imaging and analysis for preventing the dental disease, according to embodiments of present disclosure.

With reference to FIG. 2, the system 200 may include one or more processors 202. The one or more processors 202 may be implemented as one or more microprocessors, microcomputers, microcontrollers, digital signal processors, central processing units, logic circuitries, and/or any devices that manipulate data based on operational instructions. Among other capabilities, the one or more processors 202 may be configured to fetch and execute computer-readable instructions stored in a memory 204 of the system 200. The memory 204 may store one or more computer-readable instructions or routines, which may be fetched and executed to create or share the data units over a network service. The memory 204 may include any non-transitory storage device including, for example, a volatile memory such as a Random-Access Memory (RAM), or a non-volatile memory such as an Erasable Programmable Read-Only Memory (EPROM), a flash memory, and the like.

In some embodiments, the system 200 may also include an interface(s) 206. The interface(s) 206 may include a variety of interfaces, for example, interfaces for data input and output devices, referred to as I/O devices, storage devices, and the like. The interface(s) 206 may facilitate communication of the system 200 with various devices coupled to it. The interface(s) 206 may also provide a communication pathway for one or more components of the system 200. Examples of such components include, but are not limited to, processing engine(s) 208 and the database 210 (as illustrated in FIG. 1).

In some embodiments, the processing engine(s) 208 may be implemented as a combination of hardware and programming (for example, programmable instructions) to implement one or more functionalities of the processing engine(s) 208. In examples, described herein, such combinations of hardware and programming may be implemented in several different ways. For example, the programming for the processing engine(s) 208 may be processor-executable instructions stored on a non-transitory machine-readable storage medium and the hardware for the one or more processors 202 may include a processing resource, to execute such instructions. In the present examples, the machine-readable storage medium may store instructions that, when executed by the processing resource, implement the processing engine(s) 208. In such examples, the system 200 may include the machine-readable storage medium storing the instructions and the processing resource to execute the instructions, or the machine-readable storage medium may be separate but accessible to the system 200 and the processing resource. In other examples, the processing engine(s) 208 may be implemented by an electronic circuitry.

In some embodiments, the database 210 may include data that may be either stored or generated as a result of functionalities implemented by any of the components of the processors 202 or the processing engine(s) 208 or the system 200. In an embodiment, the database 210 may store data received from the UE.

In an exemplary embodiment, the processing engine(s) 208 may include one or more engines selected from any of a data ingestion engine 212 and other units/engines 214. The other units/engines 214 may include, but are not limited to, a monitoring engine, a determination engine, and the like.

In some embodiments, the one or more processors 202 may, via the data ingestion engine 212, receive one or more images captured by the intraoral camera 102 associated with the UV-A LED 104 of the intraoral device 100, and processed by the processing unit 106 of the intraoral device 100. In some embodiments, the one or more processors 202 may, via the data ingestion engine 212, segment, via the AI model, each of the one or more images (e.g., by the API 220 associated with the system 200).

In some embodiments, the one or more processors 202 may extract, via the AI model, one or more features from each of the one or more segmented images. The one or more features may include, but not limited to, an outline of teeth of the user, plaques accumulated in one or more spaces between the teeth, and plaques accumulated with gums.

In some embodiments, the one or more processors 202 may, via the data ingestion engine 212, detect one or more dental conditions of the user to prevent a dental disease of the user, based on the one or more features. In some embodiments, the one or more processors 202 may, via the data ingestion engine 212, detect the one or more dental conditions by analyzing the one or more features in each of the one or more segmented images. In some embodiments, the one or more processors 202 may, via the data ingestion engine 212, identify teeth in each of the one or more segmented images based on the one or more features. In some embodiments, the one or more processors 202 may, via the data ingestion engine 212, remove one or more regions including at least gums surrounding the teeth from each of the one or more segmented images. In some embodiments, upon removing the one or more regions, the one or more processors 202 may, via the data ingestion engine 212, detect the one or more dental conditions of the user.

In some embodiments, the one or more processors 202 may, via the data ingestion engine 212, display the one or more images received from the intraoral device 100, to the user via the UE upon authentication of one or more user credentials provided by the user. In some embodiments, the one or more processors 202 may, via the data ingestion engine 212, store the one or more images received from the intraoral device 100, and the one or more user credentials provided by the user in one or more databases 210. In some embodiments, the one or more processors 202 may, via the data ingestion engine 212, store the one or more images including a plurality of parameters in the one or more databases 210, by assigning an identifier to each of the one or more images. The plurality of parameters may include, but not limited to, a date of capture, a time of capture, and a location of capture of the one or more images.

Although FIG. 2 shows exemplary components of the system 200, in other embodiments, the system 200 may include fewer components, different components, differently arranged components, or additional functional components than depicted in FIG. 2. Additionally, or alternatively, one or more components of the system 200 may perform functions described as being performed by one or more other components of the system 200.

Figure 3:
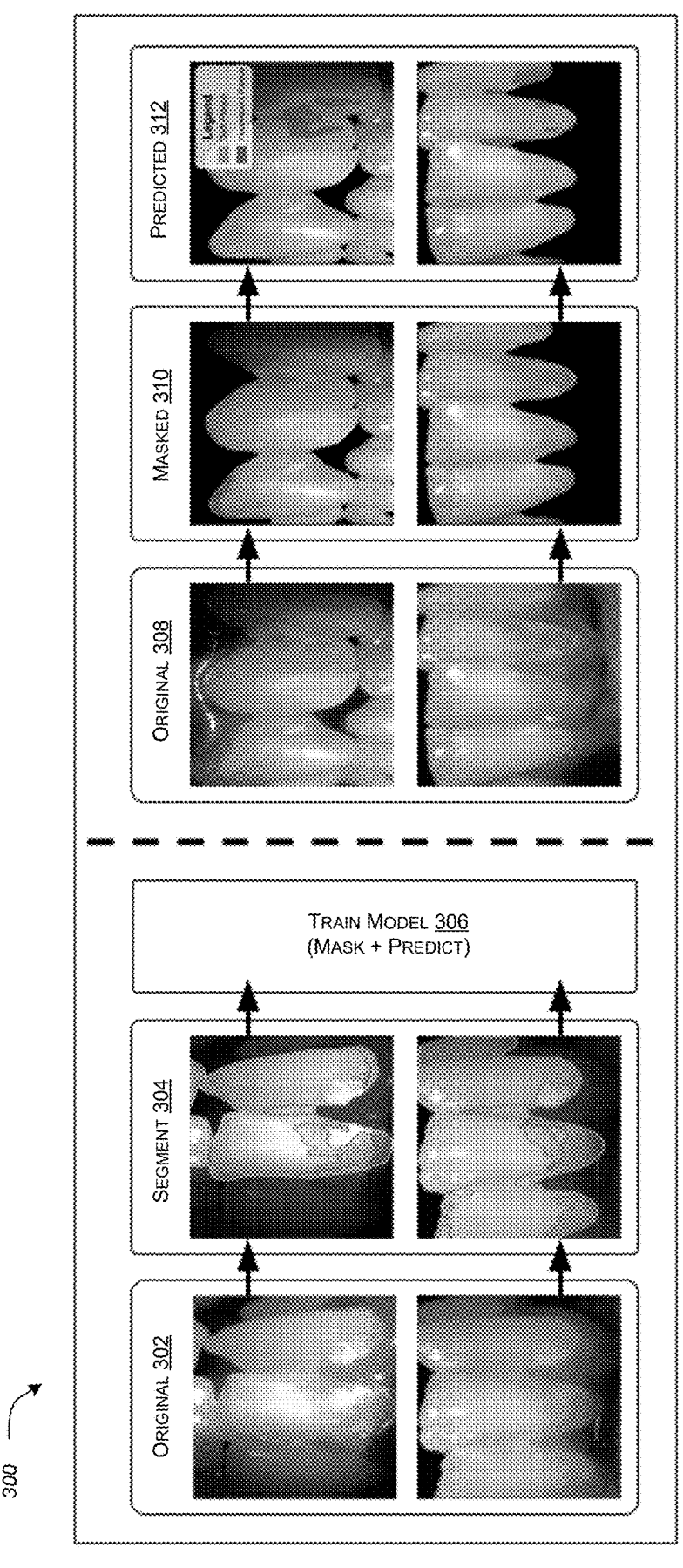
FIG. 3 illustrates an example block diagram depicting different stages in intraoral imaging and analysis, according to embodiments of present disclosure.

FIG. 3 illustrates an example block diagram 300 depicting different stages in intraoral imaging and analysis, according to embodiments of present disclosure.

With reference to FIG. 3, at 302, the system 200 may receive one or more images from the intraoral device 100. At 304, upon receiving the one or more images from the intraoral device 100, the system 200 may segment each of the one or more images by the API 230 associated with the system 200. At 306 and 308, each of the one or more images may be processed by training one or more AI models. At 310 and 312, each of the one or more images may be segmented and one or more features may be extracted from each of the one or more segmented images, via the AI model. The system 200 may analyze the one or more features in each of the one or more segmented images and identify teeth in each of the one or more segmented images based on the one or more features, via the AI model. Further, the system 200 may remove or mask one or more regions including gums surrounding the teeth from each of the one or more segmented images, and predict one or more affected areas to detect the dental conditions of the user.

In an example scenario, images of one or more user's teeth were scanned, uploaded, and manually segmented using an open-sourced software used for image labeling and processing, for example, RoboFlow™. The images were augmented by flipping the images randomly and rotating them slightly. Further, the images may be split into train, validation, and test sets, as illustrated in FIG. 3. In the segmented images, the outline of the teeth, fluorescence, and darker plaque may be differentiated using different colors.

After collection of the images, the AI model, for example, an image segmentation model (e.g., YOLOv8 model) may be transfer-learned to extract teeth from each of the segmented images using only the outlines generated in the previous step. This may allow a next plaque extraction model to avoid predicting parts of the gums as detected plaque. This approach may not segment individual teeth, and instead preserve the corners between the teeth, allowing for the detection of plaque accumulation in the spaces between the teeth and along the gum line. An example image resulting from this stage is illustrated in the masked column.

Results from the teeth extraction model may be used as a mask to remove gums from teeth in the dataset. This method may be used instead of using the original segmentation as this method may allow for errors to propagate through validation and test sets (because the model was good at generalizing to training data, training sets barely differed between the original segmentation and the mask model). Segmented plaque data may be copied over from the original segmentation, and no segmentation ever intersected with the gums/removed black area in the masked image. Another YOLOv8 model may be used for plaque identification. An example image resulting from the plaque identification stage is illustrated in the predicted column, indicating the darker plaque and fluorescence in the image.

During the process, multiple models were trained and tested to evaluate the performance on both of the teeth extraction and plaque identification tasks. Different YOLOv8 models were tested, including, without limitation, YOLOv8s and YOLOv8l, due to processing restrictions, but eventually YOLOv8x was used and higher accuracies were observed.

Both AI models may be run in succession on a same machine as the API 230 by running on a separate thread. Both the segmented image and the average plaque on each image may be saved to the S3 bucket and MongoDB™ database (but not limited to the like), and the status may be updated to indicate the scan has been processed. The average plaque on each image may be calculated by a number of pixels identified as plaque divided by a number of pixels identified as teeth (as plaque cannot be present on the gums). This may be stored as an individual score for each image, and also as an average of all images on the scan.

FIGS. 4A-4D illustrate example representations of an application user interface 402 associated with the system 200, according to embodiments of present disclosure.

With reference to FIGS. 4A-4D, the system 200 may be associated with the UE. The user may communicate with the system 200 through the application user interface 402. The UE may be embedded with the application 220 (as illustrated in FIG. 1). The application 220 may be created using, for example, but not limited to, React Native as a frontend for the user. The application 220 may be tested on all operating systems such as, iPhone Operating System (iOS™) and Android™. The application 220 may be configured to authenticate the user based on the one or more user credentials provided by the user through the application user interface 402, and display the images received from the intraoral device 100 upon a successful authentication of the user. The application 220 may be configured to scan the images before displaying the images to the user.

The application 220 may be accessed by allowing the user to sign in or to create an account. The user may sign up by providing the user's email, password, and name through the application user interface 402. The application 220 may receive the user's email, the password, and the name, and send the credentials to the API 230 to authenticate the user. The application 220 may be automatically locked if the access token received from the API 230 expires, making the user's data secure.

Figures 4A, 4B, 4C, 4D:
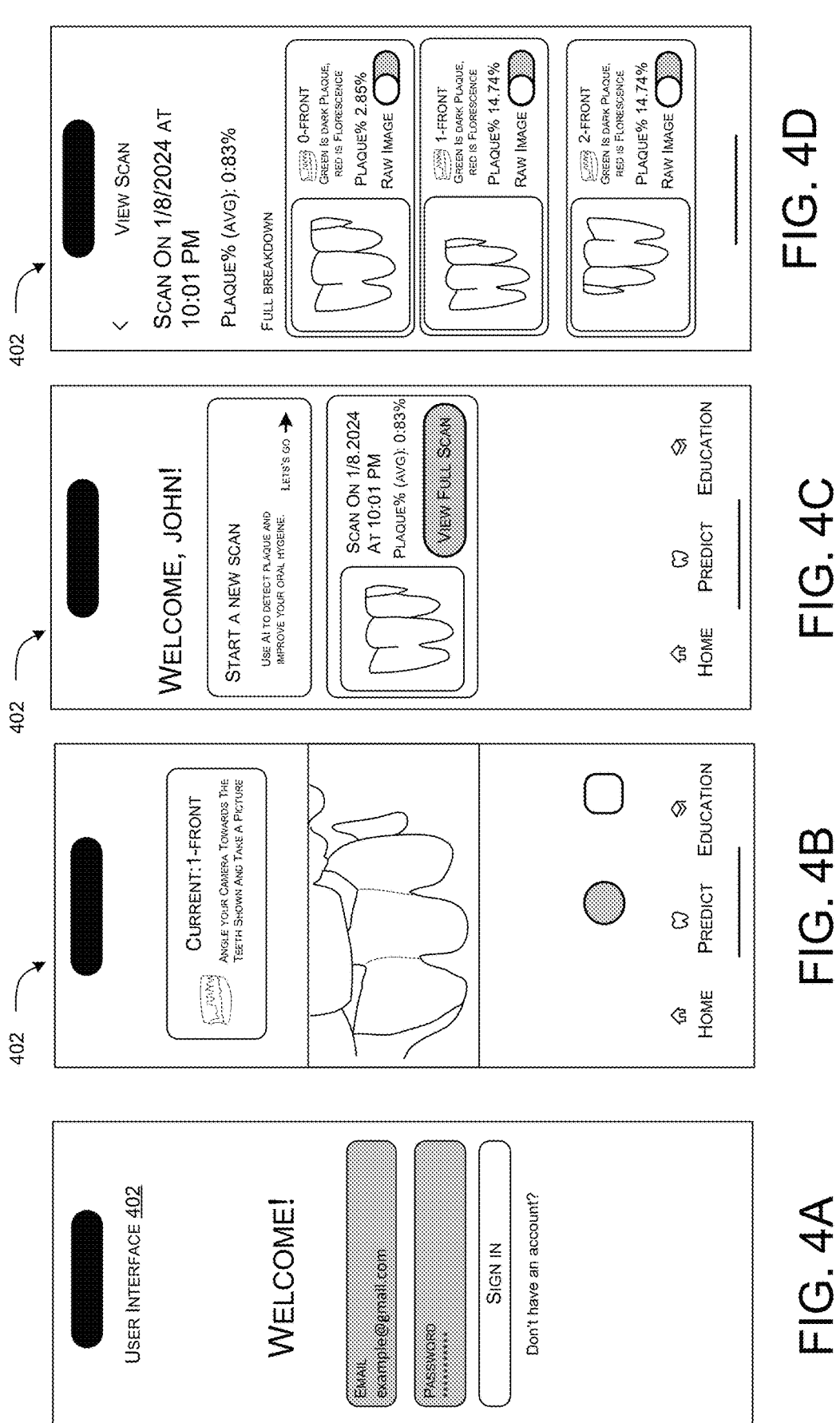
FIGS. 4A-4D illustrate example representations of an application user interface associated with the system, according to embodiments of present disclosure.

Once the application 220 is accessed, the user may land on a predict screen, and the application 220 may use HTTP to poll if the processing unit 106 is connected to the network properly. If the application 220 finds the processing unit 106, the application 220 may immediately start reading the mJPEG stream of the images created by the processing unit 106, displaying it to the user to allow the user to use it as a camera. The user may be prompted to go through each part of their mouth and take images with a small display above the camera (as illustrated in FIG. 4B), which allows the user to reference which parts of their teeth are analyzed later on. After all images are taken, the camera may be disabled and the application 220 may start uploading all the images for storage and processing by the back-end.

The system 200 may include one or more features which include, but not limited to, once the images are uploaded, the user may be allowed to see all previous scans, an average percentage of plaque detected on all the images in the scan, and open a more detailed image-by-image view of the scan on a main screen of the UE. This may allow the user to download images, which they can send to their dentist for further analysis, if necessary.

Figure 5:
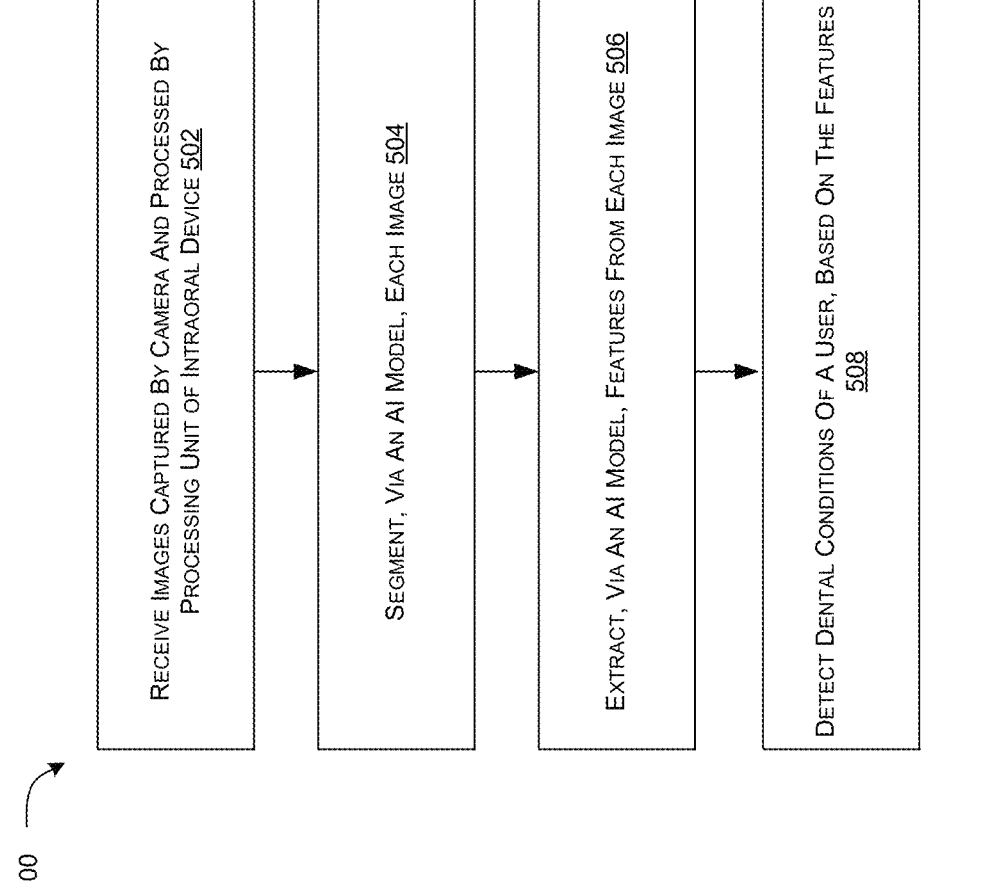
FIG. 5 illustrates a flow chart of an example method for intraoral imaging and analysis for preventing a dental disease, according to embodiments of present disclosure.

FIG. 5 illustrates a flow chart of an example method 500 for intraoral imaging and analysis for preventing the dental disease, according to embodiments of present disclosure.

With reference to FIG. 5, at block 502, the method 500 may include receiving one or more images captured by the camera 102 associated with the UV-A LED 104 of the intraoral device 100, and processed by the processing unit 106 of the intraoral device 100.

At block 504, the method 500 may include segmenting each of the one or more images, via the AI model, by the API 230 associated with the system 200. Each of the one or more images may be segmented by augmenting each of the one or more images by flipping and rotating each of the one or more images.

At block 506, the method 500 may include extracting, via the AI model, one or more features from each of the one or more segmented images. At block 508, the method 500 may include analyzing the one or more features in each of the one or more segmented images to detect one or more dental conditions of a user to prevent a dental disease of the user. The method 500 may include identifying teeth in each of the one or more segmented images based on the one or more features. Further, the method 500 may include masking or removing one or more regions including gums surrounding the teeth from each of the one or more segmented images to detect the one or more dental conditions of the user.

Figure 6:
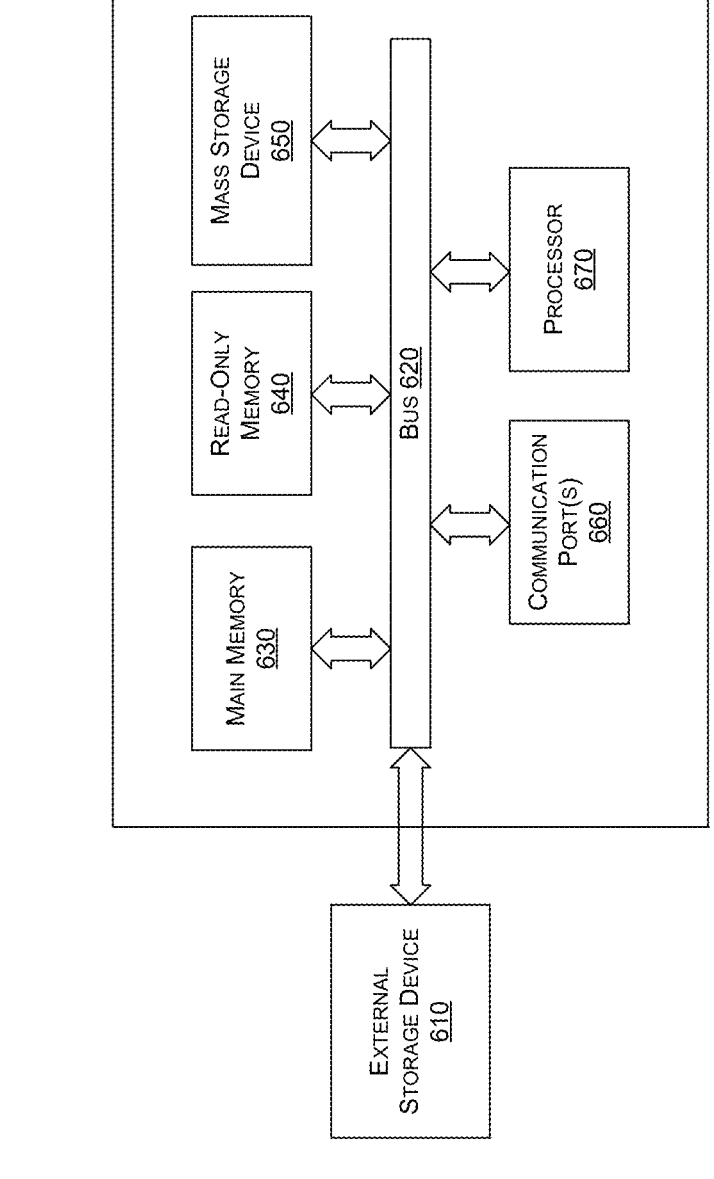
FIG. 6 illustrates an exemplary computer system in which or with which embodiments of the present disclosure may be utilized in accordance with embodiments of the present disclosure.

FIG. 6 illustrates an exemplary computer system 600 in which or with which embodiments of the present disclosure may be utilized in accordance with embodiments of the present disclosure.

With reference to FIG. 6, the computer system 600 may include an external storage device 610, a bus 620, a main memory 630, a read-only memory 640, a mass storage device 650, a communication port(s) 660, and a processor 670. A person skilled in the art will appreciate that the computer system 600 may include more than one processor 670 and communication ports 660. The processor 670 may include various modules associated with embodiments of the present disclosure. The communication port(s) 660 may be any of an RS-232 port for use with a modem-based dialup connection, a 10/100 Ethernet port, a Gigabit or 10 Gigabit port using copper or fiber, a serial port, a parallel port, or other existing or future ports. The communication ports(s) 660 may be chosen depending on a network, such as a Local Area Network (LAN), Wide Area Network (WAN), or any network to which the computer system 600 connects.

In an embodiment, the main memory 630 may be a Random-Access Memory (RAM), or any other dynamic storage device commonly known in the art. The read-only memory 640 may be any static storage device(s) e.g., but not limited to, a Programmable Read Only Memory (PROM) chip for storing static information e.g., start-up or basic input/output system (BIOS) instructions for the processor 670. The mass storage device 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

In an embodiment, the bus 620 may communicatively couple the processor(s) 670 with the other memory, storage, and communication blocks. The bus 620 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects the processor 670 to the computer system 600.

In another embodiment, operator and administrative interfaces, e.g., a display, keyboard, and cursor control device may also be coupled to the bus 620 to support direct operator interaction with the computer system 600. Other operator and administrative interfaces can be provided through network connections connected through the communication port(s) 660. Components described above are meant only to exemplify various possibilities. In no way should the aforementioned exemplary computer system 600 limit the scope of the present disclosure.

Therefore, the proposed system 200 marks a significant advancement in at-home oral health monitoring, introducing a non-invasive, at-home dental monitoring system. The system 200 may ensure effective dental disease detection by utilizing a combination of intraoral imaging and UV-A fluorescence of plaque and calculus. This may avoid an issue of contrast between dental biofilm and teeth, as plaque/calculus is often not clearly visible in normal light conditions. Pairing the system 200 with image segmentation further advances the capability of the system 200 to detect the dental biofilm. While conventional systems demonstrate the potential of using simpler Convolutional Neural Networks (CNNs) for plain image dental analysis, the proposed system 200 results in more accurate, comprehensive, and real-time analysis of oral health conditions, while allowing for scans of the entire mouth instead of only the front teeth. This level of detailed diagnostics, which has been historically limited to professional dental clinics, now shows the possibility for accessible, widespread use. The system 200 makes regular oral monitoring affordable and feasible.

In some embodiments, the methods described herein may be performed using the systems described herein. In addition, it is contemplated that the methods described herein may be performed using systems different than the systems described herein. Moreover, the systems described herein may perform the methods described herein and may perform or execute instructions stored in a non-transitory computer-readable storage medium (CRSM). The CRSM may comprise any electronic, magnetic, optical, or other physical storage device that stores executable instructions. The instructions may comprise instructions to cause a processor to perform or control performance of operations of the proposed methods. It is also contemplated that the systems described herein may perform functions or execute instructions other than those described in relation to the methods and CRSMs described herein.

Furthermore, the CRSMs described herein may store instructions corresponding to the methods described herein, and may store instructions which may be performed or executed by the systems described herein. Furthermore, it is contemplated that the CRSMs described herein may store instructions different than those corresponding to the methods described herein, and may store instructions which may be performed by systems other than the systems described herein.

The methods, systems, and CRSMs described herein may include the features or perform the functions described herein in association with any one or more of the other methods, systems, and CRSMs described herein.

In some embodiments, the method or methods described above may be executed or carried out by a computing system (for example, the computer system 600 of FIG. 6) including a tangible computer-readable storage medium, also described herein as a storage machine, that holds machine-readable instructions executable by a logic machine (e.g. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an API.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

The skilled person will be aware of a range of possible modifications of the various embodiments described above. Accordingly, the present disclosure is defined by the claims and their equivalents.

What is claimed is:

1. A system for intraoral imaging and analysis for preventing a dental disease, the system comprising:

one or more processors; and a memory operatively coupled to the one or more processors, wherein the memory comprises processor-executable instructions, which on execution, cause the one or more processors to:

receive one or more images captured by at least one intraoral camera comprising a camera, wherein the intraoral camera is configured to capture images of an area of the oral cavity from a plurality of different angles so as to capture spaces between pairs of teeth and between the gums and a tooth, and a 3D-printed attachment, associated with an Ultraviolet-A Light Emitting Diode (UV-A LED) configured to transmit light between 395-405 nm to form an intraoral device, and processed by a processing unit of the intraoral device, wherein the camera is positioned on the 3D-printed attachment such that the camera and the 3D-printed attachment that comprise the intraoral camera are configured to capture the one or more scans comprising one or more images of an entire mouth, including molars and backs of each tooth, instead of only front teeth;

extract, via a first image segmentation model, a region associated with teeth and gums of the user in the received one or more images, to generate a mask that contains one or more of (a) a space between one or more of the teeth and the gums in the received one or more images, and (b) a space between a first one of the teeth and a second one of the teeth in the received one or more images of the entire mouth, including the molars and the backs of each tooth, instead of only the front teeth, segment, via a second image segmentation model that is not the first image segmentation model, one or more features present on the mask, wherein the segmented one or more features are indicative of plaque accumulation, wherein the first image segmentation model and the second image segmentation model are transfer-learned, and display, to the user, the segmented one or more features indicative of plaque accumulation, as one or more images via a user device upon authentication of one or more user credentials provided by the user, wherein said system is configured for use in an at-home consumer setting as a consumer device comprising user equipment or a mobile device.

2. The system of claim 1, wherein the extracted features of the AI model are used as a mask to remove the gums from the teeth in a dataset associated with the one or images, and another AI model is applied to perform plaque identification.

3. The system of claim 1, wherein the memory comprises processor-executable instructions, which on execution, cause the one or more processors to store the one or more images received from the intraoral device, and the one or more user credentials provided by the user in one or more databases.

4. The system of claim 3, wherein the one or more processors is configured to store the one or more images comprising a plurality of parameters in the one or more databases, by assigning an identifier to each of the one or more images.

5. The system of claim 4, wherein the plurality of parameters comprises at least one of: a date of capture, a time of capture, and a location of capture relative to the camera's position in the oral cavity of each of the one or more images.

6. A method for intraoral imaging and analysis for preventing a dental disease, the method comprising:

receiving, by one or more processors associated with a system, one or more images captured by at least one intraoral camera, wherein the intraoral camera is configured to capture images of an area of the oral cavity from a plurality of different angles so as to capture spaces between pairs of teeth and between the gums and a tooth, comprising a camera and an elongated body with 3D-printed attachment, associated with an Ultraviolet-A Light Emitting Diode (UV-A LED) configured to transmit light between 395-405 nm to form an intraoral device, and processed by a processing unit of the intraoral device, wherein the camera is positioned on the elongated body with 3D-printed attachment such that the camera and the elongated body with 3D-printed attachment that comprise the intraoral camera are configured to capture the one or more scans comprising one or more images of an entire mouth, including molars and a back of each tooth, instead of only front teeth, wherein the system is configured to permit scanning of the mouth, including the backs of the teeth and the molars, such that teeth can be individually analyzed, and location data in an oral cavity of the mouth is preserved, wherein the intraoral camera is configured to capture images of an area of the oral cavity from a plurality of different angles, so as to capture spaces between pairs of teeth and between the gums and a tooth, and wherein each of the one or more images inside the user's mouth is associated with a location of capture relative to the camera's position in the oral cavity, the location of capture including molars and back-sides of each tooth;

extracting, via a first image segmentation model, a region associated with teeth and gums of the user in the received one or more images, to generate a mask that contains one or more of (a) a space between one or more of the teeth and the gums in the received one or more images, and (b) a space between a first one of the teeth and a second one of the teeth in the received one or more images of the entire mouth, including the molars and the backs of each tooth, instead of only the front teeth, segmenting, via a second image segmentation model that is not the first image segmentation model, one or more features present on the mask, wherein the segmented one or more features are indicative of plaque accumulation, wherein the first image segmentation model and the second image segmentation model are transfer-learned, and displaying, to the user, the segmented one or more features indicative of plaque accumulation, as one or more images via a user device upon authentication of one or more user credentials provided by the user, wherein said system is configured for use in an at-home consumer setting as a consumer device comprising user equipment or a mobile devices.

7. The method of claim 6, extracted features of the AI model are used as a mask to remove the gums from the teeth in a dataset associated with the one or images, and another AI model is applied to perform plaque identification.

8. The method of claim 6, comprising storing, by the one or more processors, the one or more images received from the intraoral device, and the one or more user credentials provided by the user in one or more databases.

9. The method of claim 8, wherein storing, by the one or more processors, the one or more images comprising a plurality of parameters in the one or more databases comprises assigning an identifier to each of the one or more images.

10. The method of claim 9, wherein the plurality of parameters comprises at least one of: a date of capture, a time of capture, and a location of capture relative to the camera's position in the oral cavity.

11. A non-transitory computer-readable medium having executable instructions stored thereon, such that when said instructions are executed by a processor, the processor performs:

receiving, by one or more processors associated with a system, one or more images captured by at least one intraoral camera, wherein the intraoral camera is configured to capture images of an area of the oral cavity from a plurality of different angles so as to capture spaces between pairs of teeth and between the gums and a tooth, comprising a camera and a 3D-printed attachment, associated with an Ultraviolet-A Light Emitting Diode (UV-A LED) configured to transmit light between 395-405 nm to form an intraoral device, and processed by a processing unit of the intraoral device, wherein the camera is positioned on the 3D-printed attachment such that the camera and the 3D-printed attachment that comprise the intraoral camera are configured to capture the one or more scans comprising one or more images of an oral cavity of the mouth, including molars and the backs of each tooth, wherein the system is configured to permit scanning of the mouth, including the backs of the teeth and the molars, such that teeth can be individually analyzed, and location data in an oral cavity of the mouth is preserved, and wherein each of the one or more images inside the user's mouth is associated with a location of capture relative to the camera's position in the oral cavity, the location of capture including molars and backsides of each tooth;

extracting, via a first image segmentation model, a region associated with teeth and gums of the user in the received one or more images, to generate a mask that contains one or more of (a) space between one or more of the teeth and the gums in the received one or more images, and (b) a space between a first one of the teeth and a second one of the teeth in the received one or more images including the molars and the backs of each tooth, instead of only the front teeth, segmenting, via a second image segmentation model that is not the first image segmentation model, one or more features present on the mask, wherein the segmented one or more features are indicative of plaque accumulation, wherein the first image segmentation model and the second image segmentation model are transfer-learned, and displaying, to the user, the segmented one or more features indicative of plaque accumulation, as one or more images via a user device upon authentication of one or more user credentials provided by the user, wherein said system is configured for use in an at-home consumer setting as a consumer device comprising user equipment or a mobile device.

12. The system of claim 1, wherein the system is configured to permit scanning of a mouth, including backs of teeth and molars, such that teeth can be individually analyzed, and location data in an oral cavity of the mouth is preserved.

13. The system of claim 12, wherein the intraoral camera is configured to capture images of an area of the oral cavity from a plurality of different angles so as to capture spaces between pairs of teeth and between the gums and a tooth, and wherein each of the one or more images is associated with an intrinsic location in the mouth, including the front teeth and one or more of molars and backsides of each tooth.

14. The method of claim 6, wherein the captured images are combined to generate a composite view of the oral cavity.

15. The non-transitory computer-readable medium of claim 11, wherein the captured images are combined to generate a composite view of the oral cavity.

* * * * *